US009825574B2

(12) United States Patent
De

(10) Patent No.: US 9,825,574 B2
(45) Date of Patent: Nov. 21, 2017

(54) CHILLER MOTOR CONTROL SYSTEM

(75) Inventor: Tathagata De, Charlotte, NC (US)

(73) Assignee: CARRIER CORPORATION, Farmington, CT (US)

( * ) Notice: Subject to any disclaimer, the term of this patent is extended or adjusted under 35 U.S.C. 154(b) by 738 days.

(21) Appl. No.: 13/583,961

(22) PCT Filed: May 9, 2011

(86) PCT No.: PCT/US2011/035699
§ 371 (c)(1),
(2), (4) Date: Sep. 11, 2012

(87) PCT Pub. No.: WO2011/143087
PCT Pub. Date: Nov. 17, 2011

(65) Prior Publication Data
US 2013/0043819 A1 Feb. 21, 2013

Related U.S. Application Data

(60) Provisional application No. 61/333,370, filed on May 11, 2010.

(51) Int. Cl.
*H02P 3/18* (2006.01)
*H02P 27/06* (2006.01)
*H02P 29/024* (2016.01)

(52) U.S. Cl.
CPC ............ *H02P 27/06* (2013.01); *H02P 29/025* (2013.01); *H02P 29/026* (2013.01)

(58) Field of Classification Search
USPC .................................. 318/817, 801, 803, 112
See application file for complete search history.

(56) References Cited

U.S. PATENT DOCUMENTS 5,537,830 A 7/1996 Goshaw et al.
5,553,997 A 9/1996 Goshaw et al.
(Continued)

FOREIGN PATENT DOCUMENTS

CN 101202515 A 6/2008
DE 4306307 A1 9/1994
(Continued)

OTHER PUBLICATIONS

PCT International Search Report and Written Opinion of the International Searching Authority for International Application No. PCT/US2011/035699, Oct. 4, 2012, 9 pages.
(Continued)

*Primary Examiner* — Bickey Dhakal
(74) *Attorney, Agent, or Firm* — Cantor Colburn LLP

(57) ABSTRACT

A chiller system (200) includes a motor (212), a motor controller (214) connected to the motor (212), the motor controller (214) operative to send a control signal to the motor (212), a rectifier (206) connected to an alternating current (AC) power source (204), the rectifier (206) operative to receive AC power and output direct current (DC) power, a DC bus (208) connected to the rectifier (206), a first inverter (210) connected to the DC bus (208) and the motor (212), the first inverter (210) operative to receive DC power from the DC bus (208) and output AC power to the motor (212), and a second inverter (213) connected to the DC bus (208) operative to receive DC power and output AC power to the motor controller (214).

16 Claims, 2 Drawing Sheets

(56) References Cited

U.S. PATENT DOCUMENTS

| | | | |
|---|---|---|---|
| 5,669,294 | A | 9/1997 | Klemm et al. |
| 5,772,214 | A | 6/1998 | Stark |
| 6,679,076 | B1 | 1/2004 | Duga et al. |
| 7,202,626 | B2 | 4/2007 | Jadric et al. |
| 7,603,874 | B2 | 10/2009 | Fink et al. |
| 7,957,166 | B2 * | 6/2011 | Schnetzka et al. ........ 363/56.03 |
| 8,004,803 | B2 * | 8/2011 | Schnetzka ................... 361/42 |
| 8,353,174 | B1 * | 1/2013 | Jadric et al. ................ 62/228.4 |
| 8,508,166 | B2 * | 8/2013 | Marcinkiewicz et al. .... 318/438 |
| 2003/0078742 | A1 | 4/2003 | Vanderzee et al. |
| 2005/0258795 | A1 * | 11/2005 | Choi ............................ 318/625 |
| 2007/0063661 | A1 | 3/2007 | Galli et al. |
| 2007/0151265 | A1 * | 7/2007 | Crane et al. .................... 62/175 |
| 2009/0109713 | A1 | 4/2009 | Schnetzka et al. |
| 2010/0068984 | A1 * | 3/2010 | Hansson ...................... 454/184 |

FOREIGN PATENT DOCUMENTS

| | | |
|---|---|---|
| EP | 0754541 A2 | 1/1997 |
| EP | 1936293 A1 | 6/2008 |

OTHER PUBLICATIONS

PCT International Preliminary Report on Patentability and Written Opinion of the International Searching Authority for International Application No. PCT/US2011/035699, Nov. 22, 2012, 6 pages.

Chinese Office Action for application CN 201180023349.1, dated Mar. 17, 2017, 13pgs.

Chinese Office Action for application CN 201180023349.1, dated May 5, 2016, 12pgs.

Chinese Office Action for application CN 201180023349.1, dated Jul. 3, 2015, 12pgs.

Chinese Office Action for application CN 201180023349.1, dated Nov. 4, 2014, 14pgs.

Chinese Office Action for application CN 201180023349.1, dated Dec. 29, 2015, 11 pgs.

* cited by examiner

CHILLER MOTOR CONTROL SYSTEM

BACKGROUND OF THE INVENTION

The subject matter disclosed herein relates to motor control systems, particularly motor control systems in cooling systems.

FIG. 1 illustrates a prior art example of a motor control system. The system includes a variable frequency drive (VFD) 102 connected to an alternating current (AC) power source 104. The VFD 102 includes a rectifier 106 connected to a direct current (DC) bus 108, an inverter 110 and a VFD controller 109. The inverter is connected to a chiller motor 112. A motor controller 114 is mechanically connected to a chiller compressor 116 and is communicatively connected to the AC power source 104 and the chiller motor 112 via the VFD controller 109 and the inverter 110.

In operation, the rectifier 106 receives AC power from the AC power source 104 and rectifies the AC power to DC power. The DC bus 108 includes a capacitor that stores a capacitive charge and outputs DC power to the inverter 110. The inverter converts the DC power to AC power and drives the chiller motor 112. The motor controller 114 receives AC power from the AC power source 104 and sends control signals to control the chiller motor 112.

If AC power is lost to the system, the charge stored in the capacitor continues to power the chiller motor however; the motor controller may not receive power and may shutdown.

BRIEF DESCRIPTION OF THE INVENTION

According to one aspect of the invention, a chiller system includes a motor, a motor controller connected to the motor, the motor controller operative to send a control signal to the motor, a rectifier connected to an alternating current (AC) power source, the rectifier operative to receive AC power and output direct current (DC) power, a DC bus connected to the rectifier, a first inverter connected to the DC bus and the motor, the first inverter operative to receive DC power from the DC bus and output AC power to the motor, and a second inverter connected to the DC bus operative to receive DC power and output AC power to the motor controller.

According to another aspect of the invention, a method for controlling a system includes receiving alternating current (AC) power from an AC power source, rectifying the AC power into direct current (DC) power, charging a capacitor with the DC power, inverting DC power from the capacitor into AC power, and outputting AC power to a chiller motor and a motor controller.

According to yet another aspect of the invention, a chiller system includes a variable frequency drive unit connected to an alternating current (AC) power source, a chiller motor connected to the variable frequency drive unit, the chiller motor operative to receive AC power from the variable frequency drive unit, an inverter connected to the variable frequency drive unit, the inverter operative to receive DC power from the variable frequency drive unit and output AC power, and a motor controller connected to the inverter and the chiller motor, the motor controller operative to receive AC power from the inverter and send a control signal to the chiller motor.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
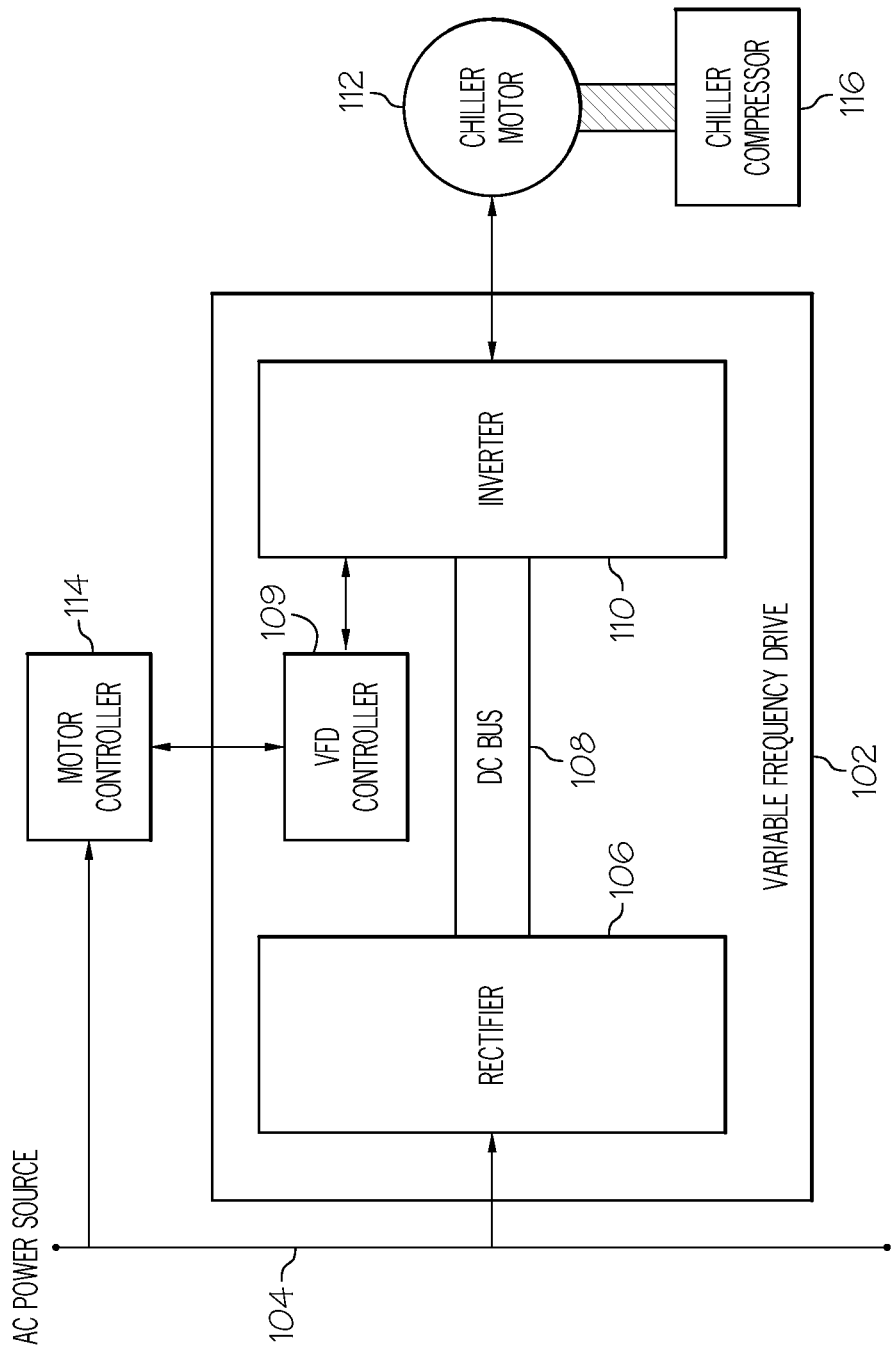
FIG. 1 illustrates a prior art example of a motor control system.
Figure 2:
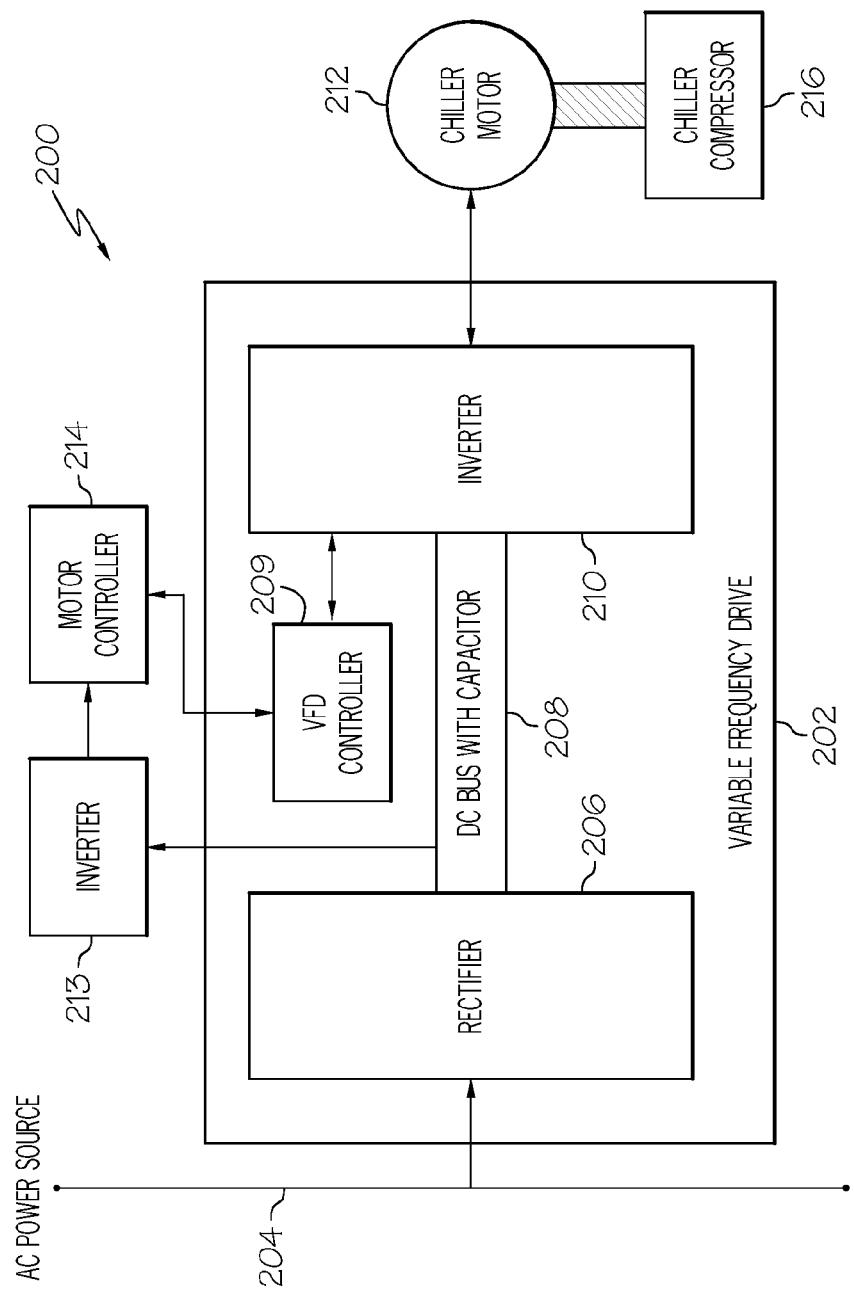
FIG. 2 illustrates an exemplary embodiment of a motor control system.

FIG. 2 illustrates an exemplary embodiment of a motor control system 200. The system includes a variable frequency drive unit (VFD) 202 that is connected to an AC power source 204. The VFD 202 includes a rectifier 206 connected to a DC bus 208, an inverter 210, and a VFD controller 209. The DC bus 208 includes a capacitor. The system 200 includes a chiller motor 212 mechanically connected to a chiller compressor unit 216. The VFD 202 is connected to an inverter 213 that is connected to a motor controller 214. The chiller motor 212 is connected to the VFD 202 and the motor controller 214 via the VFD controller 209 and the inverter 210. In alternate embodiments, the motor controller 214 may send control signals to the chiller motor 212 directly via the inverter 210, bypassing the VFD controller 209.

In operation, the rectifier 206 receives AC power from the AC power source 204. The rectifier 206 rectifies the AC power into DC power that charges the capacitor in the DC bus 208. The inverter 210 receives DC power from the capacitor in the DC bus 208 and outputs AC power to drive the chiller motor 212. The inverter 213 receives DC power from the capacitor in the DC bus 208 and outputs AC power to the motor controller 214. The motor controller 214 sends control signals to the chiller motor 212 via the VFD controller 209. The chiller motor mechanically drives the chiller compressor unit 216. Alternatively, the motor controller 214 may send control signals directly to the chiller motor 212, bypassing the VFD controller 209.

If AC power is lost from the AC power source 204, the capacitive charge stored in the capacitor in the DC bus 208 continues to supply DC power to the inverters 210 and 213 that output AC power to the chiller motor 212 and the motor controller 214 respectively. Supplying both the chiller motor 212 and the motor controller 214 with power from the same source—the capacitor in the DC bus 208—allows both the motor controller 214 and the chiller motor 212 to continue synchronous operation in the event of a loss of AC power.

In the illustrated embodiment, the capacitor in the DC bus 208 is sized to store a capacitive charge that may drive the chiller motor 212 and power the motor controller 214 for approximately 5-15 minutes in the event of a loss of AC power. The parameters described above are mere examples. Alternate systems may include any appropriate design parameters depending on power specifications.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A chiller system including:
   a motor;
   a motor controller connected to the motor, the motor controller operative to generate a control signal;
   a rectifier connected to an alternating current (AC) power source, the rectifier operative to receive AC power and output direct current (DC) power;
   a DC bus connected to the rectifier;
   a first inverter connected to the DC bus and the motor, the first inverter operative to receive DC power from the DC bus and output AC power to the motor;
   a variable frequency drive unit controller communicatively connected to the motor controller and the first inverter, the variable frequency drive unit controller receiving the control signal from the motor controller; and
   a second inverter separate from the first inverter, the second inverter connected to the DC bus operative to receive DC power and output AC power to the motor controller.

2. The system of claim 1, wherein the system includes a chiller unit mechanically driven by the motor.

3. The system of claim 1, wherein the DC bus includes a capacitor electrically connected to the DC bus.

4. The system of claim 3, wherein the capacitor is operative to receive DC power from the rectifier and store a capacitive charge.

5. The system of claim 4, wherein the first inverter is operative to receive the stored capacitive charge from the capacitor.

6. The system of claim 4, wherein the second inverter is operative to receive the stored capacitive charge from the capacitor.

7. A chiller system including:
   a variable frequency drive unit connected to an alternating current (AC) power source;
   a chiller motor connected to the variable frequency drive unit, the chiller motor operative to receive AC power from the variable frequency drive unit;
   an inverter connected to the variable frequency drive unit, the inverter operative to receive DC power from the variable frequency drive unit and output AC power;
   a motor controller connected to the inverter and the chiller motor, the motor controller operative to receive AC power from the inverter and generate a control signal; and
   the variable frequency drive unit communicatively connected to the motor controller, the variable frequency drive unit receiving the control signal from the motor controller.

8. The system of claim 7, wherein the variable frequency drive unit includes a rectifier connected to an AC power source operative to receive AC Power and rectify the AC power into DC power.

9. The system of claim 8, wherein the variable frequency drive unit includes a capacitor operative to receive DC power from the rectifier and store a DC charge.

10. The system of claim 9, wherein the variable frequency drive unit includes a second inverter operative to receive DC power from the capacitor and output the AC power to the chiller motor.

11. The system of claim 7, wherein the system includes a chiller unit mechanically connected to the chiller motor.

12. The system of claim 7, wherein the variable frequency drive unit includes a variable frequency drive unit controller communicatively linked to the motor controller and the chiller motor.

13. A method for controlling a system, the method including:
   receiving alternating current (AC) power from an AC power source;
   rectifying the AC power into direct current (DC) power;
   charging a capacitor with the DC power;
   inverting DC power from the capacitor into AC power; and
   outputting AC power to a chiller motor and a motor controller;
   wherein the DC power from the capacitor is inverted into AC power by a first inverter connected to the chiller motor;
   wherein the DC power from the capacitor is inverted into AC power by a second inverter connected to the motor controller, the second inverter separate from the first inverter.

14. The method of claim 13, wherein the method includes controlling the chiller motor with the motor controller.

15. The method of claim 13, wherein the method includes driving the chiller motor with the AC power.

16. The method of claim 13, wherein the method includes mechanically driving a chiller unit with the chiller motor.

* * * * *